(12) United States Patent
Freker et al.

(10) Patent No.: US 6,408,398 B1
(45) Date of Patent: Jun. 18, 2002

(54) METHOD AND APPARATUS FOR DETECTING TIME DOMAINS ON A COMMUNICATION CHANNEL

(75) Inventors: David E. Freker, Folsom; Andrew M. Volk, Granite Bay, both of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/474,338

(22) Filed: Dec. 29, 1999

(51) Int. Cl.⁷ ................................................. G06F 1/04
(52) U.S. Cl. ....................... 713/500; 713/600
(58) Field of Search .................. 713/400, 401, 713/500, 503, 600

(56) References Cited

U.S. PATENT DOCUMENTS

| | | | | |
|---|---|---|---|---|
| 5,392,407 A | * | 2/1995 | Heil et al. .................... | 395/325 |
| 5,418,825 A | | 5/1995 | Cantrell et al. ................ | 377/48 |
| 5,463,643 A | | 10/1995 | Gaskins et al. ............. | 371/40.1 |
| 6,226,729 B1 | * | 5/2001 | Stevens et al. ............. | 711/171 |
| 6,285,962 B1 | * | 9/2001 | Hunter ........................ | 702/117 |

FOREIGN PATENT DOCUMENTS

EP 0605170 A1 12/1993 ........... G06F/13/40

OTHER PUBLICATIONS

PCT Search Report, PCT/US00/31946, May 29, 2001, 3 pages.

* cited by examiner

*Primary Examiner*—Dennis M. Butler
(74) *Attorney, Agent, or Firm*—Blakely, Sokoloff, Taylor & Zafman LLP (57) ABSTRACT

According to one embodiment, a computer system is disclosed. The computer system includes a memory controller, a first Rambus channel coupled to the memory controller, a memory system coupled to the first Rambus channel and a second Rambus channel coupled to the memory system. The memory system is adaptable to determine the number of time domains on the first Rambus channel and the second Rambus channel. In a further embodiment, the memory system is adaptable to levelize memory devices coupled to the first and second Rambus channels.

25 Claims, 7 Drawing Sheets

METHOD AND APPARATUS FOR DETECTING TIME DOMAINS ON A COMMUNICATION CHANNEL

FIELD OF THE INVENTION

The present invention relates to memory systems; more particularly, the present invention relates to levelizing memory devices in different time domains on a Rambus channel.

BACKGROUND

The Rambus Dynamic RAM (RDRAM) developed by Rambus, Inc., of Mountain View, Calif., is a type of memory that permits data transfer operations at speeds up to 1.2–1.6 gigabytes per second. RDRAM chips are housed in Rambus in-line memory modules (RIMMs) that are coupled to one or more Rambus channels. Typically, the expansion channels couple each RDRAM chip to a memory controller. The memory controller enables other devices, such as a Central Processing Unit (CPU), to access the RDRAMs.

Often the RDRAMs on a channel are located in different time domains. Time domains result from a skew at a memory device resulting from the time it takes a clock pulse to travel to and from a memory controller from a RDRAM. The skew for each RDRAM on an expansion channel is different. For instance, an RDRAM on an expansion channel that is close to the memory controller may have a very small skew, while an RDRAM further away from the memory controller may have a large skew.

Once the skew for a RDRAM exceeds a one clock period, the skew comes back in phase at a 360° shift. A new time domain is created each time the clock skew goes through a 360° cycle. The problem with having RDRAMs in different time domains is that the memory controller perceives the RDRAMs in later time domains to be slower. For example, if a RDRAM is one time domain behind the RDRAM closest to the memory controller it is perceived to be one clock cycle slower than the closest RDRAM.

In order to solve the problem of having RDRAMs in multiple time domains, RDRAMs that are located closer to the controller add appropriate delay such that they are perceived by the controller as being as slow as the furthest RDRAM. In an expansion channel with time domains 0, 1 and 2 for example, RDRAMs in time domain 0 must incur a two level delay and RDRAMs in time domain 1 must incur a one level delay. The RDRAMs are delayed by programming a configuration register within the requisite RDRAMs upon system 100 startup.

The process of determining how many time domains exist, where the boundaries between them are and programming the appropriate delay in the RDRAMs is referred to as levelization. Typically, the time domains on a channel are difficult to ascertain. Therefore, a mechanism for automatically determining the number of time domains on a channel is desired.

SUMMARY OF THE INVENTION

According to one embodiment, a computer system is disclosed. The computer system includes a memory controller, a first Rambus channel coupled to the memory controller and a memory system coupled to the first Rambus channel. The memory system is adaptable to determine the number of time domains on the first Rambus channel.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments but are for explanation and understanding only.

DETAILED DESCRIPTION

Figure 1:
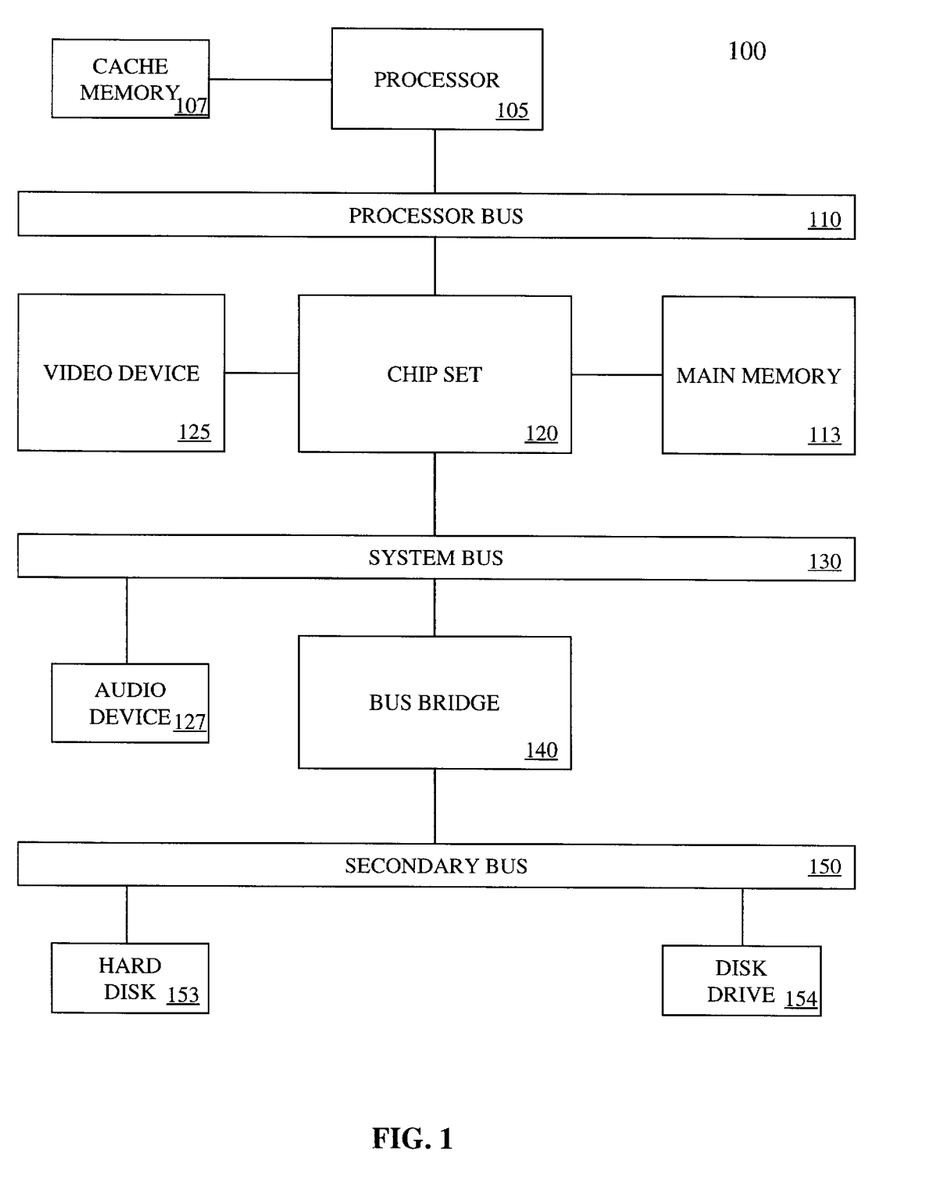
FIG. 1 is a block diagram of one embodiment of a computer system.

FIG. 1 is a block diagram of one embodiment of a computer system 100. Computer system 100 includes a central processing unit (processor) 105 coupled to processor bus 110. In one embodiment, processor 105 is a processor in the Pentium® family of processors including the Pentium® II family and mobile Pentium® and Pentium® II processors available from Intel Corporation of Santa Clara, Calif. Alternatively, other processors may be used. Processor 105 may include a first level (L1) cache memory (not shown in FIG. 1).

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. Cache memory 107 is optional and is not required for computer system 100.

Chip set 120 is also coupled to processor bus 110. Chip set 120 may include a memory controller for controlling a main memory 113. Further, chipset 220 may also include an Accelerated Graphics Port (AGP) Specification Revision 2.0 interface 320 developed by Intel Corporation of Santa Clara, Calif. AGP interface 320 is coupled to a video device 125 and handles video data requests to access main memory 113.

Main memory 113 is coupled to processor bus 110 through chip set 120. Main memory 113 and cache memory 107 store sequences of instructions that are executed by processor 105. In one embodiment, main memory 113 includes a Rambus dynamic random access memory (RDRAM) system; however, main memory 113 may have other configurations. The sequences of instructions executed by processor 105 may be retrieved from main memory 113, cache memory 107, or any other storage device. Additional devices may also be coupled to processor bus 110, such as multiple processors and/or multiple main memory devices. Computer system 100 is described in terms of a single processor; however, multiple processors can be coupled to processor bus 110. Video device 125 is also coupled to chip set 120. In one embodiment, video device includes a video monitor such as a cathode ray tube (CRT) or liquid crystal display (LCD) and necessary support circuitry.

Processor bus 110 is coupled to system bus 130 by chip set 120. In one embodiment, system bus 130 is a Peripheral Component Interconnect (PCI) Specification Revision 2.1 standard bus developed by Intel Corporation of Santa Clara, Calif.; however, other bus standards may also be used. Multiple devices, such as audio device 127, may be coupled to system bus 130.

Bus bridge 140 couples system bus 130 to secondary bus 150. In one embodiment, secondary bus 150 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al. Multiple devices, such as hard disk 153 and disk drive 154 may be coupled to secondary bus 150. Other devices, such as cursor control devices (not shown in FIG. 1), may be coupled to secondary bus 150.

Figure 2:
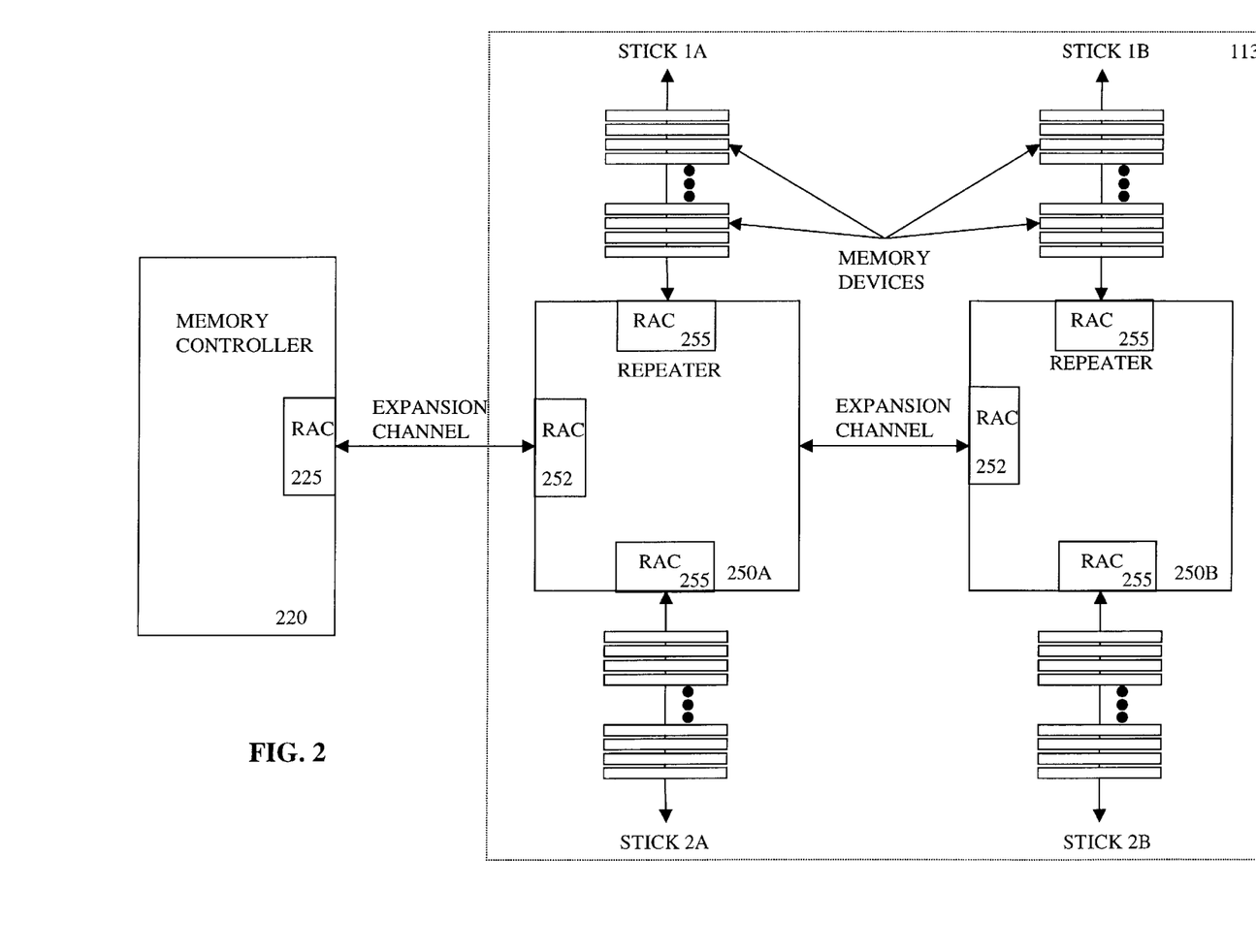
FIG. 2 is a block diagram of one embodiment of a memory controller coupled to a main memory through repeater hubs.

FIG. 2 is a block diagram of one embodiment of a memory controller 220 coupled to a main memory 113. Memory controller 220 includes a Rambus Asic Cell (RAC) 225. RAC 225 is used to interface low frequency logic (e.g., 100 Mhz) to a high frequency expansion channel. Further, the expansion channel may be driven at 400 Mhz, and transfer data on the rising and falling edge of an expansion channel clock.

Main memory 113 includes repeaters 250A and 250B coupled to memory controller 220 via the expansion channel. Repeaters 250A and 250B are each coupled to two stick channels (Stick A and Stick B). Repeaters 250A and 250B monitor the expansion channel for activity from memory controller 220 and repeats the activity on one of the stick channels. The stick channels coupled to each repeater function as an extension of the expansion channel. According to one embodiment, each stick channel includes 32 RDRAM devices that are included within one or more memory modules. Alternatively, each stick channel may include other quantities of RDRAM devices. Ordinarily, a maximum of 32 memory devices may be directly coupled to the expansion channel. Therefore, the stick channels coupled to repeaters 250A and 250B permit up to 128 memory devices to be accessed by memory controller 220.

In addition, both repeaters may include two master RACs 255 and one slave RAC 252. As described above with respect to RAC 225, RACs 252 interface low frequency logic within repeaters 250A and B with the expansion channel, while RACs 255 are used to interface the logic within repeaters 250A and B to the stick channels. According to one embodiment, slave RACs 252 include decoupled transmit and receive clock generators (not shown).

Further, a separate clock generator (not shown) is coupled to the expansion channel and each of the stick channels. Each clock generator generates a differential clock that synchronizes the data operations on a channel. The differential clock pulses for each channel propagates toward the master RAC of a channel (i.e., clock to master (or CTM)). After reaching the master RAC, the pulses propagate away from the master RAC (i.e., clock from master (or CFM)). For example, clock pulses generated on stick channel 1A propagate through each memory device on the stick before reaching master RAC 255 at repeater 250A. The pulses propagate through each memory device again as they proceed away from master RAC 255 toward the termination point of the stick channel. Therefore, each memory device on a stick channel receives two clock sources (CTM and CFM).

There is a skew between the CTM and CFM at a memory device resulting from the time it takes a clock pulse to travel to a master RAC from a memory device (CTM) and travel back as CFM. The skew for each memory device on a channel may be different. For instance, the first memory device on a channel (i.e., the memory device closest to the master RAC) may have a very small skew since the time between receiving CTM and CFM is small. However, the memory device farthest away from a master RAC may have a large skew due to the amount of time required for CTM to reach, and CFM to return from, the RAC.

Once the CTM-CFM skew for a memory device reaches a clock period, the skew comes back in phase at a 360° shift. According to one embodiment, the skew comes back in phase upon exceeding a threshold of 2.5 nanoseconds. For each time the skew of a memory device enters a different phase, the memory device is considered to be in a different time domain. The problem with having memory devices in different time domains is that memory controller 220 perceives memory devices in later time domains to be slower. For example, if a memory device is one time domain behind the memory device closest to a RAC it is perceived to be one clock cycle slower than the closest memory device.

In order to solve the problem of having memory devices in multiple time domains, memory devices in closer time domains must be delayed. In a stick channel with time domains of 0, 1 and 2, for example, memory devices in time domain 0 must incur a two level delay and memory devices in time domain 1 must incur a one level delay. The memory devices are delayed by programming configuration registers within the requisite memory devices upon system 100 startup. This process is typically referred to as stick channel levelization.

Figure 3:
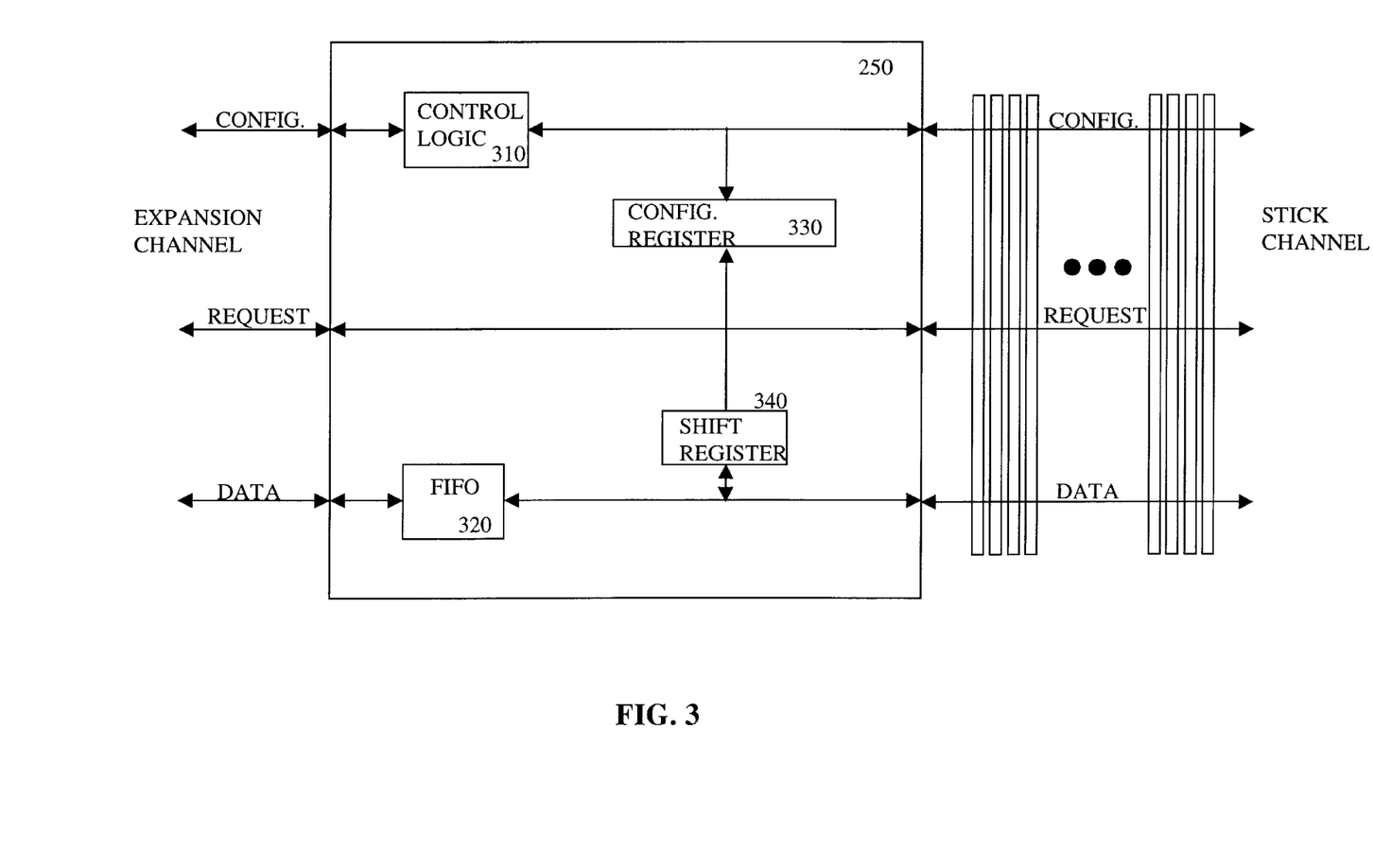
FIG. 3 is a block diagram of one embodiment of a repeater.

However, in order to levelize each stick channel, the number of time domains on each stick must be determined. FIG. 3 is a block diagram of one embodiment of a repeater 250 for implementing a time domain detection mechanism. As described above, repeaters 250 are coupled between an expansion and at least one stick channel. The expansion and stick channels are each divided into request and data components. The request component is used to provide address and command information to the RDRAMs. The data component is used to transmit data to and from the memory devices.

Repeater 250 includes control logic 310, a first in first out (FIFO) register 320, a configuration register 330 and a shift register 340. Control logic 310 is coupled to the configuration component of the expansion and stick channels. Control logic 310 performs sequences of operations within repeater 250, such as reading and writing configuration registers. FIFO 320 is coupled to the data component of the expansion and stick channels. FIFO 320 is used to synchronize data from the master RAC to the slave RAC.

Configuration register 330 is coupled to control logic 310 and contains repeater 250 settings and configuration information. According to one embodiment, configuration register 330 stores the number of time domains on each stick channel coupled to repeater 250, as well as information regarding which time domain on the expansion channel the repeater is in. Shift register 340 is coupled to FIFO 320 and configuration register 330. Shift register may receive test data from one or more memory devices whenever repeater 250 is operating in a stock channel time domain detection mode.

Figure 4:
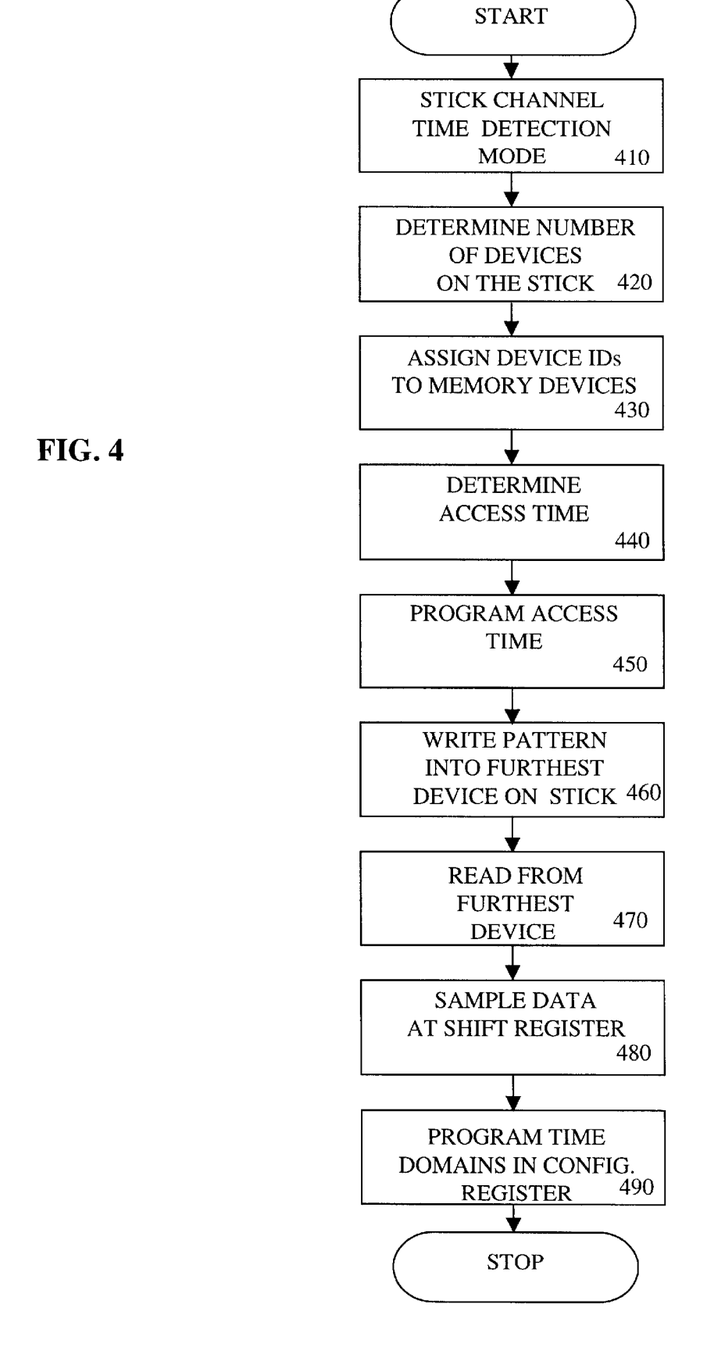
FIG. 4 is a flow diagram of one embodiment for detecting time domains on a stick channel.

FIG. 4 is a flow diagram of one embodiment for detecting time domains on a stick channel. At process block 410, repeater 250 enters the stick channel time domain detection mode. According to one embodiment, the time domain detection mode is entered upon startup of computer system 100. At process block 420, the number of memory devices and the furthest memory device on a stick channel is determined. The address of the last memory device on a stick channel may be determined by reading a Serial Presence Detect Erasable Programmable Read Only Memory (SPD EPROM) (not shown) for each memory module on the stick channel. The SPD EPROMs store information about the memory devices each memory module contains, including, for example, size, speed, voltage, row and column addresses and manufacturer.

At process block 430, device identifications (IDs) are programmed into each memory device on the stick channel. According to one embodiment, device IDs are assigned to the RDRAMs sequentially wherein the closest device is assigned ID0, the next device ID1, etc. Nevertheless, it will be appreciated by one of ordinary skill in the art that device IDs may be assigned using various other methods. At process block 440, the access time for the memory devices on the stick channel is determined by reading the SPD EPROMs for the memory modules on the stick channel. At process block 450, the access time is stored in configuration register 330.

At process block 460, a test data pattern is written from a BIOS ROM within computer system 100 into the furthest memory device on the stick channel. According to one embodiment, the test data is a 16 byte pattern consisting of zeroes and a one wherein the one is the leading bit of the least significant 8 bits of the pattern. However, one of ordinary skill in the art will appreciate that other configurations may be used to implement the data pattern.

At process block 470, a read command is performed at the furthest memory device on the stick channel from the location the data pattern was written. At process block 480, repeater 250 waits a period of time corresponding with the access time for the memory devices before sampling the data pattern into register 340. According to one embodiment, only the 8 least significant bits of the data pattern is sampled into register 340. The location of the one in register 340 indicates the number of clock cycles required for the test pattern to reach memory controller 220, which correlates with the number of time domains on the stick channel. For example, if the value stored in register 340 is 0000_0001, one clock cycle elapsed before receiving the data pattern (i.e., one time domain), and if the value stored in the register is 0000_0010, two clock cycles elapsed before receiving the data pattern (i.e., two time domains).

At process block 490, the stick channel time domains are programmed into configuration register 330. The stick channel time domains stored in configuration register 330 may be used to program the delay for the stick channel in order to provide channel levelization discussed below.

Figure 5:
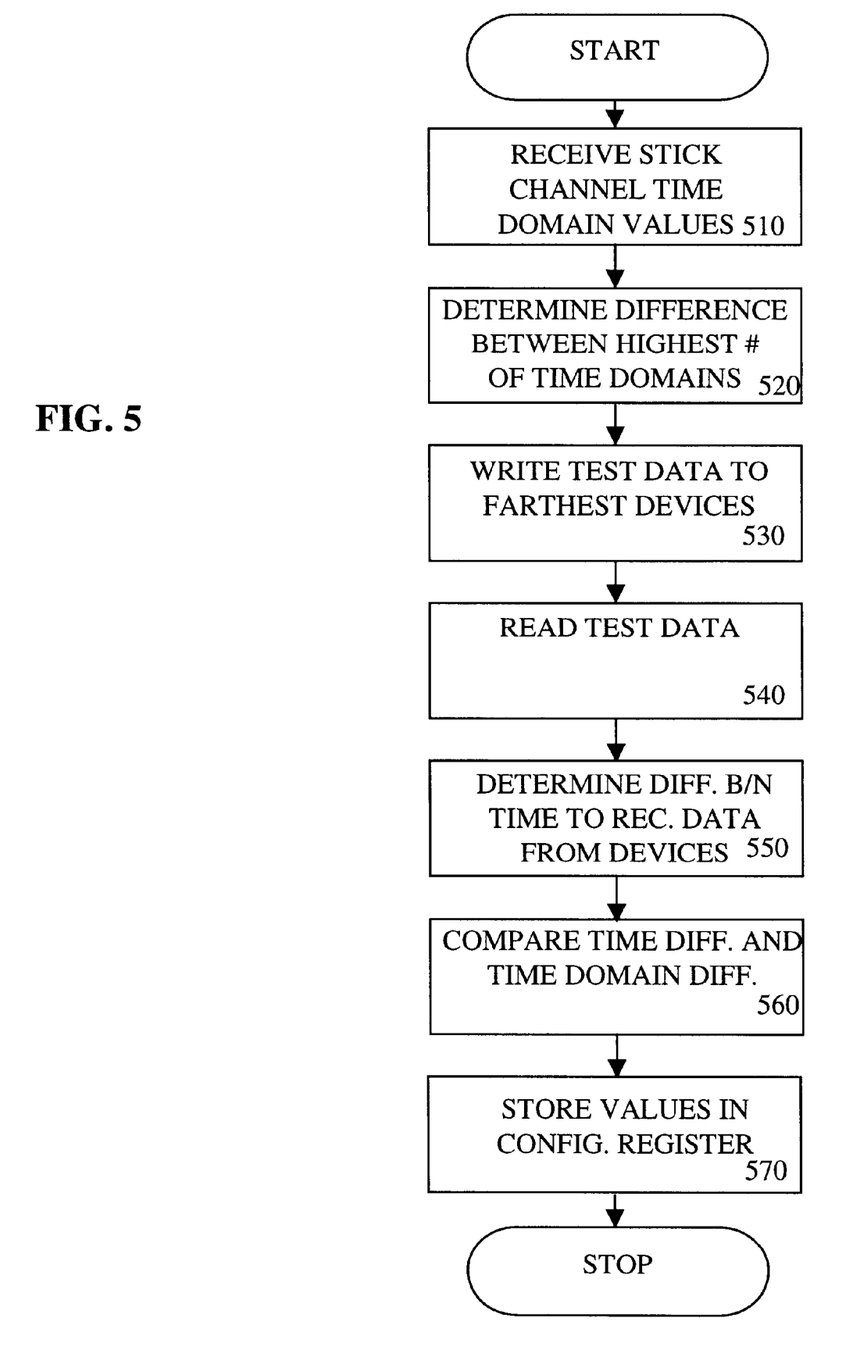
FIG. 5 is a flow diagram of one embodiment for detecting time domains on an expansion channel.

Moreover, repeaters 250A and 250B may also be located in different time domains on the expansion channel. Therefore, it may be necessary to determine the number of time domains on the expansion channel while computer system 100 is operating in the time domain detection mode. FIG. 5 is a flow diagram of one embodiment for detecting the number of time domains on an expansion channel. At process block 510, the time domain values for the stick channels on repeaters 250A and 250B are retrieved from the respective configuration registers 330. These values are generated by the stick channel time detection mechanism described above.

At process block 520, the difference between the highest number of time domains on repeaters 250A and 250B are determined. Referring to FIG. 2 as an example, stick channels 1A, 1B, 2A and 2B have 2, 3, 4 and 2 time domains respectively. Consequently, stick channels 1B and 2A would have the highest number of time domains for their respective repeaters, making the difference between the highest number of time domains 1 (or 4−3). At process block 530, a test data pattern is written from BIOS to the farthest memory device on repeater 250A and 250B (e.g., the farthest devices on stick channels 1B and 2A). At process block 540, the test data is read from the devices in which it was written. At process block 550, the difference between the number of clock cycles necessary to receive the test data from the memory device on repeater 250A and the number of clock cycles necessary to receive the test data from the memory device on repeater 250B is determined.

At process block 560, the magnitude of the difference between the required clock cycles and the difference in stick channel time domains for the respective repeaters are compared. Since the number of clock cycles needed to receive the test data at memory controller 220 from the farthest memory device on a stick channel corresponds with the number of time domains on a channel, any number of clock cycles in excess of the difference between the highest number of time domains on repeaters 250A and 250B is equivalent to the number of expansion channel time domains. For example, if 5 and 3 clock cycles elapse before the test data is received from the farthest memory devices on stick channels 1B and 2A, respectively, the number of time domains attributable to the expansion channel is a value of 1 (i.e., the clock cycle difference of 2 exceeds the difference between stick channel time domains by 1). At process block 570, the expansion channel time domain value is stored in configuration register 330 of repeaters 250A and 250B.

Figure 6:
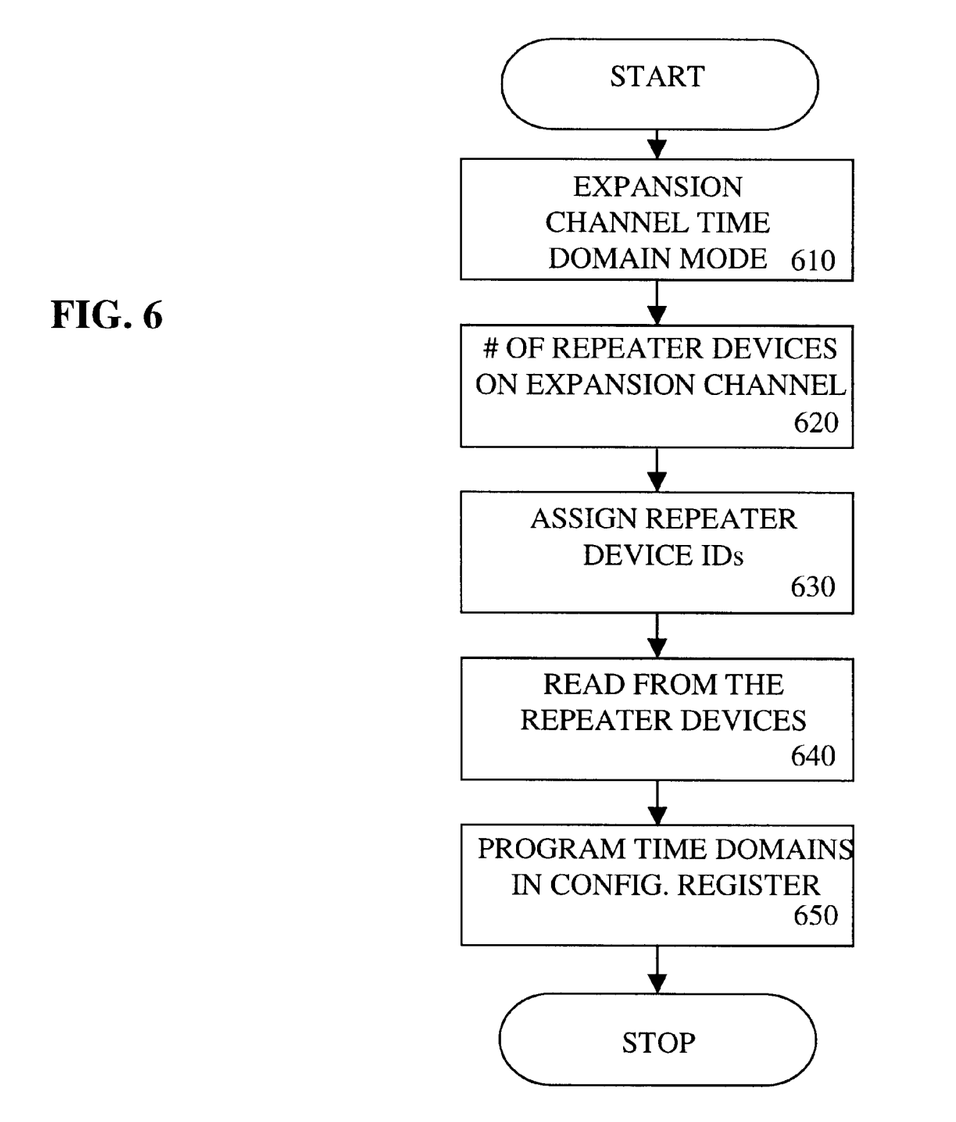
FIG. 6 is a flow diagram of another embodiment for detecting time domains on an expansion channel.

FIG. 6 is a flow diagram of another embodiment for detecting time domains on the expansion channel independent of stick channel time domain detection. At process block 610, repeaters 250A and 250B (FIG. 3) enter an expansion channel time domain detection mode. According to one embodiment, the expansion channel time domain detection mode is entered after implementation of the stick channel time domain detection mode. Alternatively, the expansion channel time domain detection mode may be entered into upon startup of computer system 100. At process block 620, the number of repeaters 250 on the expansion channel is determined by examining the configuration register 330 within each repeater 250 residing on the expansion channel.

At process block 630, device identifications (IDs) are assigned to each repeater 250 on the expansion channel. At process block 640, a read from each repeater 250 (e.g., A and B) on the expansion channel is performed by issuing a read command to one of the stick channels of each repeater 250. The first repeater on the channel responds by transmitting a test data pattern to memory controller 220.

According to one embodiment, the first bit transmitted is a 1 followed by a string of zeroes. Memory controller 220 samples the test pattern for eight clock pulses. If the repeater 250 is in the first time domain, a 0000_0001 data pattern is received at memory controller 220. However, if the repeater 250 is in the second time domain, a 0000_0010 data pattern is received, and so on. This process is repeated for each successive repeater 250 on the expansion channel. After all repeaters 250 have been tested, the number of time domains on the expansion channel is ascertained. At process block 650, the expansion channel time domains are programmed into configuration register 330.

According to a further embodiment, repeater 250 may perform levelization of the expansion bus and equalization of any differences in the number of time domains on the multiple stick channels coupled to a repeater 250. In such an embodiment, multiple stick channels coupled to repeater 250 may have different time domains. The levelization and equalization functions are implemented by programmable delay lines.

Referring to FIG. 2, the amount of delay programmed into a RAC 255 is determined by the stick channel and expansion channel time domain values programmed into configuration register 330 (FIG. 3). For example, if configuration register 330 in repeater 250A indicates that stick channels 1A and 2A have time domains of 2 and 4, respectively, a delay of two is programmed into the programmable delay line coupled to stick channel 1A. Also, if configuration register 330 in repeater 250B indicates that stick channels 1B and 2B have time domains of 3 and 2, respectively, a delay of one is programmed into the programmable delay line coupled to stick channel 2B.

Moreover, if there is a time domain difference between repeaters 250A and 250B on the expansion channel, an additional delay must be programmed into the programmable delay line within repeater 250A. For example, if one time domain separates repeaters 250A and 250B, a delay of one must be programmed into the programmable delay line within repeater 250. Accordingly, the RAC 255 coupled to stick channel 2A will have one clock cycle delay while the RAC 255 coupled to stick channel 1A will have a total delay of three clock cycles.

Figure 7:
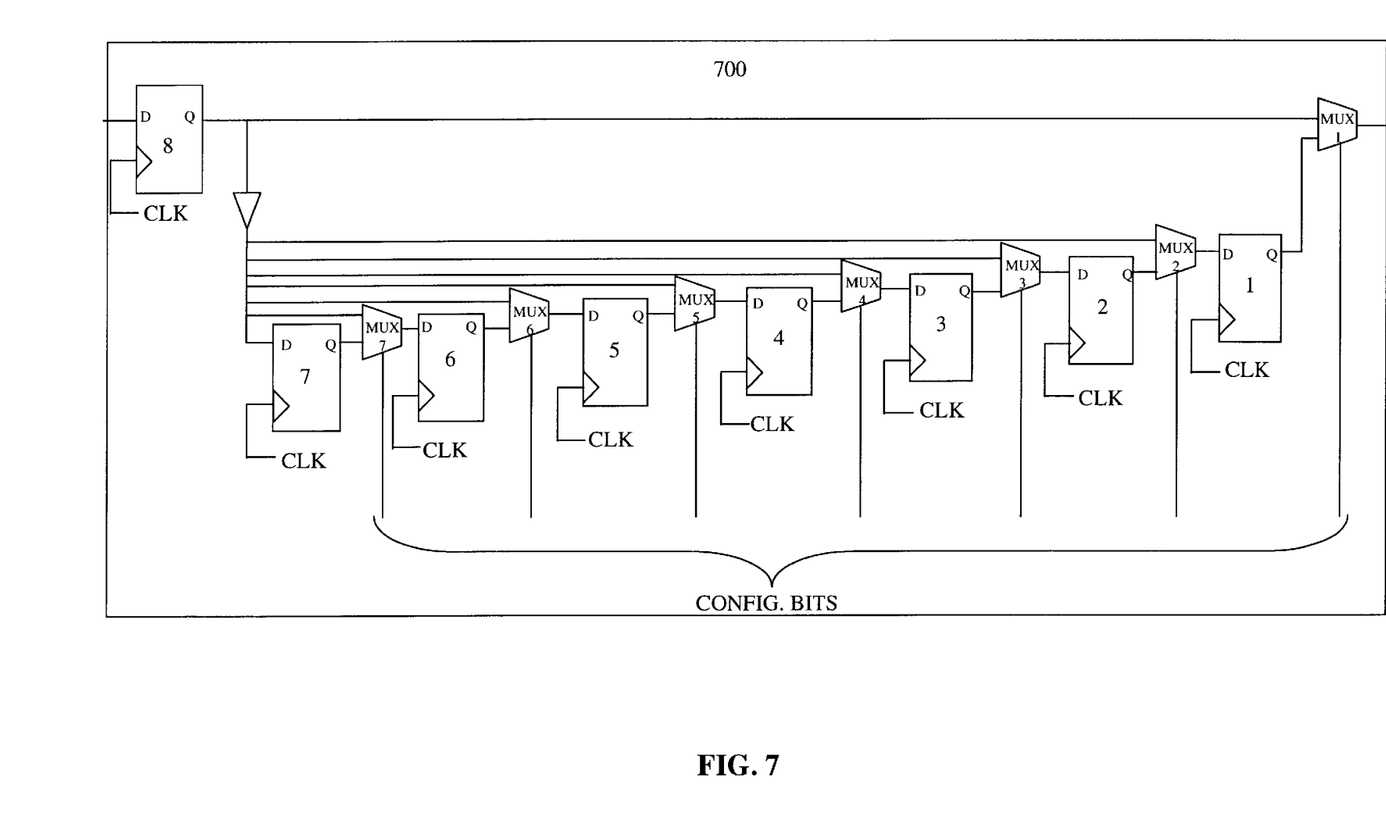
FIG. 7 is a block diagram of one embodiment of a programmable delay register.

FIG. 7 is a block diagram of one embodiment of a programmable delay line 700 included within a repeater used for levelizing. Programmable delay line 700 includes registers 1–8 and multiplexers (MUXs) 1–7. Registers 1–7 are coupled serially via MUXs 2–7 in order to provide up to seven clock cycles of delay to data received from a stick channel at register 8. In addition, MUXs 1–7 receive a seven bit configuration signal from configuration register 330 as select signals. If the select bit at a particular MUX is a logical zero, the inverted signal received at the MUX from register 8 is selected to be transmitted.

However, if the select bit at a particular MUX is a logical one, the output of the register coupled to the MUX is transmitted. For example, if the configuration signal is 0000000, MUX 1 selects the signal from register 8. As a result, no delay is added to data received from a stick channel. If the configuration signal is 0000001, MUX 1 selects the signal received from register 1, which receives the signal from register 8 via MUX 2. Accordingly, a one clock cycle delay is added to data received from a stick channel.

As a further example, if the configuration signal is 0000011, MUX 1 selects the signal received from register 1, which receives the signal from register 2 via MUX 2. Register 2, in turn, receives the signal from register 8 via MUX 3. Therefore, a two clock cycle delay is added to data received from a stick channel. One of ordinary skill in the art will appreciate that other register and MUX combinations may be used to implement the RAC functions described above.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

Thus, a mechanism for automatically determining the number of time domains on a channel has been described.

What is claimed is:

1. A computer system comprising:
   a memory controller;
   a first Rambus channel coupled to the memory controller; and
   a memory system, coupled to the first Rambus channel, that determines the number of time domains on the first Rambus channel by reading a test pattern from a first memory device coupled to the first Rambus channel.

2. The computer system of claim 1 further comprising:
   a second Rambus channel coupled to the memory system that determines the number of time domains on the second Rambus channel by reading a test pattern from a second memory device coupled to the second Rambus channel.

3. The computer system of claim 2 wherein the memory system levelizes memory devices coupled to the first and second Rambus channels.

4. The computer system of claim 3 wherein the memory system comprises:
   a first repeater coupled between the first and second Rambus channels.

5. The computer system of claim 4 wherein the memory system further comprises:
   a third Rambus channel coupled to the first repeater;
   a second repeater coupled to the third Rambus channel; and
   a fourth Rambus channel coupled to the second repeater.

6. The computer system of claim 5 wherein the first repeater comprises a first Rambus Asic cell coupled to the first Rambus channel and the second repeater comprises a second Rambus Asic cell coupled to the second Rambus channel.

7. The computer system of claim 6 wherein the first and second Rambus Asic cells comprise a plurality of registers, wherein the plurality of registers delay data received from the first and second Rambus channels for levelization of the memory devices coupled to the first and second Rambus channels.

8. The computer system of claim 2 wherein the first Rambus channel is a Rambus expansion channel and the second Rambus channel is a Rambus stick channel.

9. The computer system of claim 4 wherein the first repeater is a memory repeater hub.

10. A method comprising:
    determining the number of memory devices on a Rambus channel;
    writing a test pattern to a first memory device on the Rambus channel;
    reading the test data from the first memory device;
    sampling the data at a repeater coupled to the Rambus channel to determine the number of time domains coupled to the Rambus channel; and
    programming the time domains at the repeater.

11. The method of claim 10 further comprising:
    placing the repeater into a time detection mode before determining the number of memory devices on the Rambus channel.

12. The method of claim 10 further comprising:
    assigning device identification numbers to each of the memory devices after determining the number of memory devices on the Rambus channel; and
    determining the access time of the memory devices.

13. The method of claim 10 wherein the first memory device is the furthest memory device on the Rambus channel from the repeater.

14. A method comprising:

receiving time domain values from a repeater coupled to a Rambus expansion channel;

determining the difference between the highest time domains on a first stick channel and a second stick channel;

writing test data to a first memory device coupled to the first stick channel;

writing test data to a second memory device coupled to the second stick channel;

reading the test data from the first and second memory devices;

determining the difference between the time to receive the data read from the first memory device and the time to receive the data read from the second memory device; and comparing the time difference with the difference between the highest number of time domains to determine the number of time domains on the expansion channel.

15. The method of claim 14 further comprising storing the number of time domains on the expansion channel in the repeater.

16. The method of claim 14 wherein the first memory device is the furthest memory device on the first stick channel and the second memory device is the furthest memory device on the second stick channel.

17. A method of detecting the number of time domains on a Rambus channel comprising:

determining the number of repeater devices on the Rambus channel;

assigning a device identification to each repeater; and reading data from a first repeater, wherein the data indicates the time domain in which the first repeater is located.

18. The method of claim 17 further comprising: placing each repeater on the Rambus channel in a time domain detection mode.

19. The method of claim 17 further comprising reading data from a second repeater, wherein the data indicates the time domain in which the second repeater is located.

20. The method of claim 17 further comprising programming the time domain into a register located in the first repeater.

21. A memory system comprising:

a first repeater coupled to a first Rambus channel; and a second Rambus channel coupled to the first repeater; the repeater determines the number of time domains on the first and second Rambus channels by reading a test pattern from a first memory device coupled to the first Rambus channel and reading a test pattern from a second memory device coupled to the second Rambus channel.

22. The memory system of claim 21 wherein the first repeater levelizes memory devices coupled to the first and second Rambus channels.

23. The memory system of claim 21 further comprising:

a third Rambus channel coupled to the first repeater;

a second repeater coupled to the third Rambus channel; and a fourth Rambus channel coupled to the second repeater.

24. The memory system of claim 23 wherein the first repeater comprises a first Rambus Asic cell coupled to the first Rambus channel and the second repeater comprises a second Rambus Asic cell coupled to the second Rambus channel.

25. The memory system of claim 24 wherein the first and second Rambus Asic cells comprise a plurality of registers, wherein the plurality of registers delay data received from the first and second Rambus channels for levelization of the memory devices coupled to the first and second Rambus channels.

* * * * *